May 20, 1947.  H. D. NOLL  2,420,904
CONVERSION OF HYDROCARBONS
Filed March 17, 1945
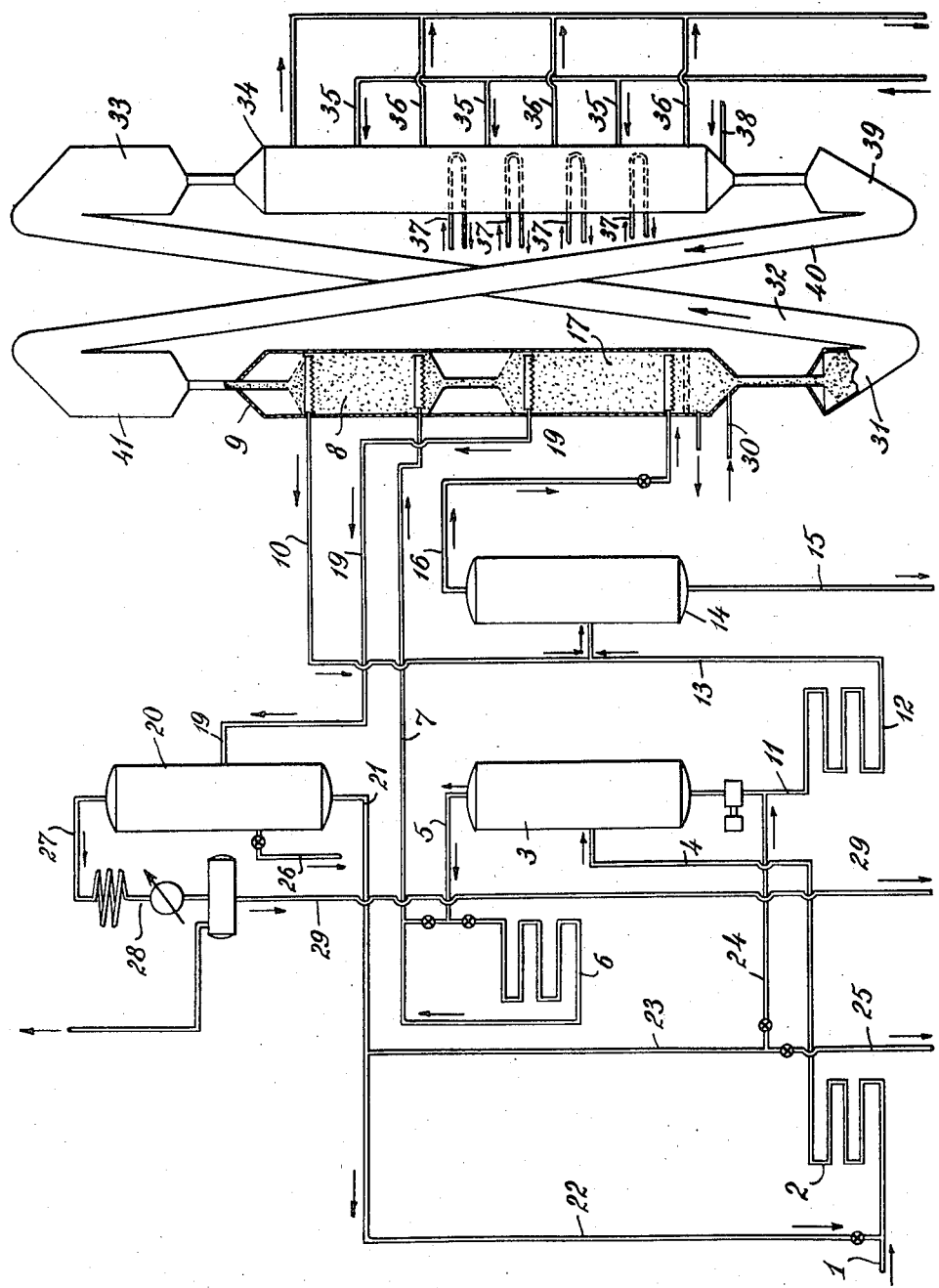
INVENTOR
HENRY D. NOLL
BY
AGENT OR ATTORNEY Patented May 20, 1947

2,420,904

UNITED STATES PATENT OFFICE 2,420,904

CONVERSION OF HYDROCARBONS

Henry D. Noll, Denville, N. J., assignor to Socony-Vacuum Oil Company, Incorporated, a corporation of New York Application March 17, 1945, Serial No. 583,267

5 Claims. (Cl. 196—52)

This invention has to do with the conversion of hydrocarbons in the presence of particle form solid adsorptive catalytic contact masses and is particularly concerned with the cracking of heavy stocks of the nature of heavy gas oils and residual stocks to products of the boiling range of gasoline.

There have recently been developed several processes wherein particle-form solid adsorptive contact masses are so utilized. The contact mass is usually an alumina or alumina-silica complex, in the form of a natural clay, as fuller's earth, or a refined or acid treated clay, or a synthetic material in pellet, granule, powder, or bead form arrived at by the formation of gels of alumina and or silica, singly or by copiecipitation, with appropriate after treatment. These materials are usually themselves catalytic to the desired reaction, but there may also be present other metallic oxides or other catalytic materials, for the desired purpose or for some collateral purpose, introduced by admixture, impregnation, coprecipitation, or other mechanism into the contact mass.

Hydrocarbon reactions in the presence of such contact masses deposit coke upon the contact mass, which must be removed, usually burned off, to regenerate the contact mass for re-use.

Several processes have lately been developed by bringing hydrocarbons into reaction in the presence of such contact mass. The oldest utilizes fixed beds, alternately on stream and under regeneration in situ. Other processes move the contact mass cyclically through reaction and regeneration. In such presently used forms of cyclic processes, the contact mass may be utilized either as a moving bed of particles of appreciable size, say 1 to 4 mm. mean diameter, or in the form of pulverulent material suspended in a cloud in reactant vapors or held in a condition of hindered settling by passage of reactant therethrough.

This invention is concerned with all such contact mass processes, and while it is particularly pertinent to and is explained in connection with a moving bed process it is not limited thereto or thereby except by such limitations as appear in the claims appended hereto.

This invention has for its particular object the provision of a process for conversion of a greater portion of a heavy stock, such as a crude residue, while limiting the deposition of coke upon the contact mass. A further object is the provision of a process whereby high coke potential materials may be eliminated from the charging stock prior to contact with the contact mass, without resorting to vacuum distillation, coking, or deasphalting treatment of the primary charging stock. A further object is a process capable of using a cleanly regenerated contact mass and a partially coked contact mass in a series operation for benefits hereinafter explained. Further objects and advantages in part will be set forth hereinafter and in part will be obvious to those skilled in the art.

In order to understand my invention, reference is now made to the drawing attached to this specification, the single figure of which shows, in a highly diagrammatic form, a setup for the practise of my invention.

In the drawing, a charge oil, such as a residual oil from the topping of a crude oil, is charged through pipe 1 and heated in coil 2 to a temperature sufficient to effect a desired degree of vaporization, later explained, in vaporizer 3, to which the heated oil passes through pipe 4. The gas oil vapors separated in vaporizer 3 pass through pipe 5 into superheater coil 6, there being heated to a desired reaction temperature, and pass thence through pipe 7 into the first stage 8 of a two stage catalytic reactor 9. The reacted vapors from 8, now having a substantial portion of gasoline and gases present and being at an elevated temperature, leave the reactor 8 through pipe 10.

Turning back to vapor separator 3, the liquid oil unvaporized therein leaves through pipe 11 and is passed through heating coil 12, which is operated either as a mere heating coil to furnish sufficient heat for a desired distillation, or, more preferably, is operated as a viscosity breaker, under conditions of time, temperature and pressure selected to give a substantial cracking of oils of high boiling point into oils of the gas oil boiling range, at relatively low recycle ratios, with a minimum ratio of gasoline produced in the process to gas oil so produced. The oils from heating coil 12 then pass through pipe 13 to be admixed with products of the first cracking step from pipe 10, and the admixture enters secondary vapor separator 14. The liquid oil remaining unvaporized in secondary vaporizer 14 is withdrawn from the system through pipe 15.

Overhead vapors from secondary vaporizer 14 pass through pipe 16 to a second stage reaction zone 17 in reactor 9. In reactor 17, the secondary vapors are brought into contact with contact mass which has already been utilized in first stage reactor 8. Effluent reactant vapors leave reactor 17 through pipe 19 and are led to fractionator 20 wherein material heavier than the desired gasoline product is condensed to a recycle gas oil and withdrawn by pipe 21. This recycle gas oil may be recycled in whole or in part within the system, either being admixed with fresh charge through pipe 22, or sent to the secondary heater coil 12 through pipe 24. A portion, if desired, may be withdrawn through pipe 25. If desired, a side cut of light gas oil may be withdrawn from the system through pipe 26. Gasoline from fractionator 20 is withdrawn through pipe 27 to be cooled, condensed, stabilized, etc., in the setup indicated diagrammatically at 28, with final gasoline product withdrawn from the system at pipe 29.

Returning to the catalytic operation, spent catalyst effluent from reactor 17 may be purged, as with steam introduced at 30, and discharged to hopper 31, from which it is moved by elevator 32 into hopper 33, passing from thence into regenerator 34.

In regenerator 34, the coke deposit is burned off, as by increments of an oxidizing regenerating medium, usually air, introduced at points 35 and removed at points 36, with or without removal of heat, as, for example, by indirect heat exchange with a heat exchange medium introduced at points 37. The regenerated contact mass may be purged of oxidizing gases, as by steam introduced at 38, and passes into hopper 39, from there to be raised by elevator 40 to bin 41 to again pass through the two stage reaction system.

The operation of the system, together with considerations of importance in connection therewith, can best be understood by discussion of the handling of an exemplary charge stock. Assume that the charge stock is a residual from distillation of a crude oil, having an initial boiling point of about 500° F. and about 10% content of asphalt. This will be so heated that vapor separation will occur in the primary vaporizer at a temperature in the top of that vaporizer, of about 830° F. to 860° F., say 840° F. This is because at temperatures above this level, which will vary somewhat with nature of charge and design of equipment, but even so will not be far from 840° F., an excessive coking occurs in the vapor section of the vapor separator, occasioning frequent shutdown.

It will be realized that such operation of vaporizer 3 cannot and does not put into vapor form nearly all of the components of the original charge which are suitable for cracking. If recycle gas oil be admixed with the charge, a somewhat greater amount can be lifted in the primary vaporizer, but still it will not get into vapor form all of the oil that is desirable cracking stock. Passing into reactor 8, which is preferably maintained at a temperature of the order of 900° F. to 975° F., say for example at about 925° F. by the heat of incoming hydrocarbons, and also by introducing hot regenerated contact mass at a temperature of about 1000° F., these vapors are substantially cracked, giving an effluent of which about fifty percent or more by volume is composed of gasoline and gases, and which in the case of countercurrent flow moving bed operation, as shown, will have a temperature of about 950° F.

The step next described is the important and characterizing portion of the operation, which gives to it the ability both to cut deeper into the available charge stock to secure therefrom materials useful for cracking which were not vaporized in vapor separator 3, and also to secure such stocks while acting to effectively exclude from the cracking operation all material of high coke-forming potentiality.

Returning to the bottom of the primary vaporizer 3, the liquid oil therefrom will be handled as follows. This oil will be heated, with or without recycle gas oil, usually without, in coil 12 to tempatures of the order of 875° F.—950° F., usually to about 900° F. to 925° F., under 100 to 400 p. s. i. gauge pressure, and preferably for a time sufficient to give a substantial viscosity breaking reaction, but insufficient to give substantial formation of thermally cracked gasoline. Emerging from this coil, the oil is admixed with effluent products from the first stage cracking, and the whole discharged into the secondary vaporizer. Operation in the secondary vaporizer is also so managed as to produce an overhead vapor at a temperature of around 830° F. to 860° F., preferably not over about 840° F., for the same reasons that vaporizer 3 was so operated. Due to the carrying power of the effluent vapors from first stage cracking and also in part to the viscosity breaking, there can be vaporized here substantially all of the remaining charge stock which it is worth while to crack, leaving as a liquid residue of the system a tar comprising from about 5% to about 10% of the original charge. To crack this, regardless of the question of how it might be brought into contact with the contact mass, is usually not preferable, resulting almost entirely in coke formation, with practically no formation of gasoline. The second cracking results in substantial conversion of the newly vaporized gas oil to gasoline, and the effluent vapors from the second stage are fractionated to give the cracked products of the system.

The second stage cracking in the example shown, will be operated at about 875° F. While the second stage cracking is fed contact mass from the first stage cracking, this does not mean that conditions therein are incapable of variation, even in the type of process shown, since space velocity (that is, volumes of cold oil per volume of space occupied by catalyst per unit of time) may be adjusted as desired by adjusting the volume of space occupied by catalyst to the desired job, either in original design or during operation.

The end result of such a process will be the consumption, in cracking, of from 90% to 95% of the residual stock originally charged, with the following typical yields, upon a once-through operation, upon the stock so consumed. Gasoline, about 45% by volume (10# RVP, 400° F. E. B. P.), light gas oil 30%, heavy gas oil 20%, excess butane 5%, coke, about 5% by weight, gases, about 300 cubic feet per barrel charged.

It will be realized by those skilled in the art that this process is capable of modification, particularly in the manner of bringing the reactant vapors and charging stock into contact, and all such modifications are considered to be within the scope of this invention, subject only to limitations expressed in the claims.

I claim:

1. In a process for the catalytic conversion of high boiling petroleum fractions into hydrocarbons of gasoline boiling range the steps which comprise: heating a high boiling feed stock and separating it into a vapor fraction having a temperature of about 840° F. and a liquid fraction, cracking the vapors so formed in the presence of a solid particle-form contact mass, heating the liquid fraction from the first separation, admixing with such liquid fraction the entire effluent vapors of the primary cracking without intervening fractionation thereof, subjecting this mixture to a second vapor separation step to form a second vapor fraction having a temperature of about 840° F. and a second liquid fraction, discarding this second liquid fraction from the system, and cracking the second formed vapors in the presence of a solid particle-form contact mass.

2. In a process for the catalytic conversion of high boiling petroleum fractions into hydrocarbons of gasoline boiling range the steps which comprise: heating a high boiling feed stock and separating it into a vapor fraction having a temperature of about 840° F. and a liquid fraction, cracking the vapors so formed in the presence of a solid particle-form contact mass, heating the liquid fraction from the first separation, admixing with such liquid fraction the entire effluent vapors of the primary cracking without intervening fractionation thereof, subjecting this mixture to a second vapor separation step to form a second vapor fraction having a temperature of about 840° F. and a second liquid fraction, discarding this second liquid fraction from the system, and cracking the second formed vapors in the presence of the contact mass previously used in the first named cracking.

3. In a process for the catalytic conversion of high boiling petroleum fractions into hydrocarbons of gasoline boiling range the steps which comprise: heating a high boiling feed stock and separating it into a vapor fraction having a temperature of about 840° F. and a liquid fraction, superheating the vapors so formed and cracking them in the presence of a solid particle-form contact mass, heating the liquid fraction from the first separation, admixing with such liquid fraction the entire effluent vapors of the primary cracking without intervening fractionation thereof, subjecting this mixture to a second vapor separation step to form a second vapor fraction having a temperature of about 840° F. and a second liquid fraction, discarding this second liquid fraction from the system, and cracking the second formed vapors in the presence of the contact mass previously used in the first named cracking.

4. In a process for the catalytic conversion of high boiling petroleum fractions into hydrocarbons of gasoline boiling range the steps which comprise: heating a high boiling feed stock and separating it into a vapor fraction having a temperature of about 840° F. and a liquid fraction, superheating the vapors so formed and cracking them in the presence of a solid particle-form contact mass, heating the liquid fraction from the first separation, under viscosity breaking conditions adjusted to secure substantial conversion to gas oils boiling below about 850° F. with a minimum ratio of thermal gasoline to gas oil so produced, admixing with such liquid fraction the entire effluent vapors of the primary cracking without intervening fractionation thereof, subjecting this mixture to a second vapor separation step to form a second vapor fraction having a temperature of about 840° F. and a second liquid fraction, discarding this second liquid fraction from the system, and cracking the second formed vapors in the presence of the contact mass previously used in the first named cracking.

5. In a process for the catalytic conversion of high boiling petroleum fractions into hydrocarbons of gasoline boiling range the steps which comprise: heating a high boiling feed stock and separating it into a vapor fraction having a temperature of about 840° F. and a liquid fraction, superheating the vapors so formed and cracking them at a temperature of at least about 900° F. in the presence of a solid particle-form contact mass, heating the liquid fraction from the first separation, under viscosity breaking conditions adjusted to secure substantial conversion to gas oils boiling below about 850° F. with a minimum ratio of thermal gasoline to gas oil so produced, admixing with such liquid fraction the entire effluent vapors of the primary cracking without intervening fractionation thereof, subjecting this mixture to a second vapor separation step to form a second vapor fraction having a temperature of about 840° F. and a second liquid fraction, discarding this second liquid fraction from the system, and cracking the second formed vapors in the presence of the contact mass previously used in the first named cracking.

HENRY D. NOLL.

REFERENCES CITED

The following references are of record in the file of this patent:

UNITED STATES PATENTS

| Number | Name | Date |
|---|---|---|
| 2,271,645 | Kanhofer | Feb. 3, 1942 |
| 2,235,133 | Zimmerman | Mar. 18, 1941 |
| 2,322,070 | Stratford et al. | June 15, 1943 |
| 2,351,422 | Gohr | June 13, 1944 |
| 2,356,611 | Peters | Aug. 22, 1944 |
| 2,356,697 | Rial | Aug. 22, 1944 |
| 2,366,218 | Ruthruff | Jan. 2, 1945 |
| 2,382,755 | Tyson | Aug. 14, 1945 |
| 2,379,711 | Hemminger | July 3, 1945 |